United States Patent [19]
Sugimoto et al.

[11] Patent Number: 6,124,426
[45] Date of Patent: Sep. 26, 2000

[54] METHOD FOR REMOVING VOLATILE MATERIALS FROM A POLYMER COMPOSITION

[75] Inventors: Ryuichi Sugimoto; Koji Kawano; Hiroya Honda, all of Takaishi; Mune Iwamoto, Tokyo; Shiro Otsuzuki, Takaishi; Kenichiro Matsuba, Chiba; Tetsuo Maeda, Urayasu; Yozo Maeda, Chiba, all of Japan

[73] Assignees: Toyo Engineering Corporation, Tokyo; Mitsui Chemicals, Inc., Takaishi, both of Japan

[21] Appl. No.: 09/160,061

[22] Filed: Sep. 24, 1998

[30] Foreign Application Priority Data

Sep. 30, 1997 [JP] Japan .................................... 9-265571

[51] Int. Cl.$^7$ ........................................................ C08F 6/00
[52] U.S. Cl. .............................................................. 528/480
[58] Field of Search .......................... 264/176.1; 528/480

[56] References Cited

U.S. PATENT DOCUMENTS

| | | | |
|---|---|---|---|
| 3,773,740 | 11/1973 | Szabo ....................... | 528/196 |
| 3,987,235 | 10/1976 | Fujimoto ................... | 528/176 |
| 4,703,105 | 10/1987 | Allada ...................... | 528/483 |
| 4,992,222 | 2/1991 | Banevicius et al. ........ | 264/45.9 |
| 5,133,913 | 7/1992 | Miyakawa et al. ........ | 264/50 |
| 5,350,813 | 9/1994 | Skilbeck .................. | 528/493 |
| 5,380,822 | 1/1995 | Skilbeck .................. | 528/499 |
| 5,442,041 | 8/1995 | Mallikarjun et al. ....... | 528/483 |
| 5,639,801 | 6/1997 | Mallikarjun et al. ....... | 521/43.5 |

FOREIGN PATENT DOCUMENTS

| | | |
|---|---|---|
| 0 798 314 | 10/1997 | European Pat. Off. . |
| 209 464 | 5/1984 | Germany . |
| 41 09 527 | 9/1991 | Germany . |
| WO 98/03560 | 1/1998 | WIPO . |

*Primary Examiner*—Terressa M. Boykin
*Attorney, Agent, or Firm*—Flynn, Thiel, Boutell & Tanis, P.C.

[57] ABSTRACT

A method for removing volatile materials, comprises adding a blowing aid to a polymer composition containing volatile materials, mixing them in a static mixing apparatus, and extruding the resultant mixture by an extruding apparatus into a devolatilizing tank, thereby the mixture is made to be blown, to cause removal of the volatile materials. First, the blowing aid (6) is discharged with an addition nozzle apparatus (2), in a direction opposite to the direction of the flow of the polymer composition (1), to be added, and the polymer composition is introduced into the static mixing apparatus (3), at a pressure at which the blowing does not take place, thereby mixing them. Then, using the extruding apparatus (11), the resultant mixture is extruded into the devolatilizing tank (4), so that the polymer is made into a blown product at such a temperature and a pressure that the blowing coefficient B is 1.4 or more, thereby causing the removal of volatile materials.

$$B = A'/A \qquad \text{Expression (1)}$$

wherein A represents the cross-sectional area of an extruding apparatus, and A' represents the average cross-sectional area of the polymer composition in a direction perpendicular to the vertical direction of the blown polymer composition, at a point where the polymer composition is dropped from the lower part of an opening section of the extruding apparatus vertically 50 cm to 1 m. The method can give a polymer composition having residual volatile materials in very small amounts, by removing volatile materials continuously with high efficiency.

15 Claims, 1 Drawing Sheet

Fig. 1

METHOD FOR REMOVING VOLATILE MATERIALS FROM A POLYMER COMPOSITION

FIELD OF THE INVENTION

The present invention relates to a method for removing volatile materials contained in a polymer composition. More specifically, the present invention relates to a method for providing a product reduced in volatile materials by adding a blowing aid to a polymer composition containing an unreacted monomer, solvent, etc., to remove volatile materials together with the blowing aid.

BACKGROUND OF THE INVENTION

In recent years, volatile materials remaining in polymer compositions have become an issue from the standpoint of hygiene and safety, and polymers that have reduced volatile materials have become demanded as products. Among techniques for removing volatile materials from polymer compositions, particularly, methods for the production of a polymer from a solution of a monomer require a step of removing an unreacted monomer and solvent from the polymer composition, the final product. For instance, such a product having residual styrene and residual solvent in a combined amount of 150 ppm or less in polystyrene, and such a product having a residual nitrile monomer in an amount of 10 ppm or less in a copolymer with a nitrile-series monomer, are desired. In the bulk polymerization of polystyrene, as a means of isolating monomer and volatile materials from the polymer composition, the removal of volatile materials is generally carried out by heating the polymer solution, under reduced pressure, to a temperature higher than the temperature at which the volatile materials vaporize.

However, although the conventional techniques can, for example, reduce the styrene and residual solvent in polystyrene easily to 500 to 1,000 ppm in total, to reduce them to 150 ppm or less, simple heating cannot attain the removal of volatile materials, and various contrivances are needed.

For instance, a method is known in which water is injected into a melted polymer, and then flushing with water is carried out under a reduced pressure, to remove residual volatiles together with the water. For example, U.S. Pat. No. 3,773,740 discloses a technique in which water is added to a polymer melt, so that 0.5 to 2.75% by weight of water is injected, and thereafter the pressure of the melt is reduced to 20 to 40 Torr, to flush with the water all at once, thereby reducing the amount of residual aromatic monomer to 0.3% by weight. This technique, however, cannot carry out a high degree of removal of volatile materials to the level demanded currently. It is conceivable to increase the removal efficiency of volatiles by further reducing the degree of the pressure reduction, but under a vapor pressure of water of less than 4.579 mmHg, water has to be cooled to less than 0° C. in order to condense the water. Accordingly, the water freezes in the condenser under a pressure in the condenser of less than 5 Torr, to lower the condensing ability. Therefore, in order to produce a polymer composition having reduced amounts of residual volatiles continuously, it is required to keep the pressure at 10 Torr or higher.

As a method for solving this problem, for example, a method is disclosed in U.S. Pat. No. 5,380,822, wherein a residual monomer, oligomers (e.g. dimer and trimer), and solvent are reduced to 500 ppm or less, and preferably 150 ppm or less, in at least one polymer, particularly a polymer of a vinyl aromatic monomer, such as a polystyrene, or in a blended composition of a polymer of a vinyl aromatic monomer with a polyphenylene oxide. In this technique, water, in an amount equal to or more than the amount of residual volatiles, i.e. in an amount of 1% by weight or more, is injected into the polymer or polymer composition, whose pressure is kept at 500 to 1,500 psi at 200 to 270° C., which polymer or polymer composition is then introduced into a flash chamber devolatilizer having a pressure-reduced zone, where the pressure is kept at less than 5 Torr, and preferably at less than 3 Torr, thereby allowing the polymer to pass through distributor tray means, to remove volatile materials. In this example, in order to bring residual volatiles to 150 ppm or less, it is required to keep the pressure in the devolatilizing tank at less than 5 Torr, preferably less than 3 Torr, to expose the water and monomer in the polymer composition. Industrially, in order to remove the water and monomer resulting from the devolatilization by condensation, an ejector is placed upstream of the condenser, to keep the pressure in the condenser at 5 Torr or more, so that water may be prevented from freezing.

Further, in U.S. Pat. No. 5,350,813, this problem is solved by adding, instead of water, an organic solvent having a lower freezing point, such as acetone and methanol.

SUMMARY OF THE INVENTION

In the above method in which an ejector is placed upstream of a condenser so that water may be prevented from freezing in the condenser, industrially, an investment in the arrangement of the ejector is required, and technically the operation of the ejector is difficult, and it is difficult to keep the pressure in the condenser and the devolatilizing tank at an optimum steadily and, also, increasing the scale size is difficult. Accordingly, when water is used, in order to prevent the water from freezing in the condenser and obtain a polymer composition having reduced amounts of volatiles continuously, the pressure in the devolatilizing tank is required to be 10 mmHg or more, so that the pressure in the condenser may not be 5 mmHg or less.

On the other hand, in the above method in which an organic solvent having a lower freezing point, such as acetone and methanol, is added to remove residual volatiles, the added acetone and methanol are liable to remain in the polymer composition, and these additives have to be removed completely.

A method is thus conceivable in which, in order to remove volatiles, the temperature of the polymer is elevated, with the pressure in a devolatilizing tank being kept at 10 mmHg or more. However, as the temperature of the polymer composition is elevated, the residual monomer is polymerized in a preheater or the like, to increase the amount of low-molecular-weight polymers in the polymers, leading to a drop in the heat resistance of the molded products, adhesion of an oily material to molds at the time of molding, and deterioration of the hue of the polymer, in some cases. Further, as the temperature of the polymer is elevated, thermal modification takes place, to cause the polymer to be discolored or deteriorate. In particular, at near the decomposition point of the polymer, the formation of decomposition gases due to the decomposition of the polymer exceeds the effect for the volatile components, and therefore it cannot be said that the method is a preferable one.

An object of the present invention is to provide a method for obtaining a polymer composition having residual volatile materials in very small amounts, by removing volatile materials continuously with high efficiency, to solve the above problems.

Other and further objects, features, and advantages of the invention will appear more fully from the following description, taken in connection with the accompanying drawing.

DETAILED DESCRIPTION OF THE INVENTION

The inventors of the present invention, having intensively investigated to solve the above problems, have found that it is important to disperse and mix uniformly a molten polymer composition, and, as a blowing aid, water, an aliphatic hydrocarbon compound containing at least one hydroxyl group or carbonyl group and having a boiling point lower than an unreacted monomer or residual solvent, or a mixture of water with such an aliphatic hydrocarbon compound, and to remove the volatile materials while blowing stably the molten polymer composition; and that a polymer having reduced amounts of residual volatile materials can be obtained by satisfying these conditions simultaneously. The present invention has been completed based on these findings.

Namely, according to the present invention there are provided:

(1) A method for removing volatile materials from a polymer composition, comprising adding a blowing aid to a polymer composition containing 2% by weight or less of volatile materials, mixing the polymer composition and the blowing aid in a static mixing apparatus, and extruding the resultant mixture by an extruding apparatus into a devolatilizing tank, where the mixture is blown, to cause removal of volatile materials from the polymer composition, wherein

[1] in the addition of the blowing aid to the polymer composition, the blowing aid is discharged through an addition nozzle apparatus, in a direction opposite to the direction of flow of the said polymer composition, and the polymer composition to which the blowing aid has been added is introduced into a static mixing apparatus, at a temperature range at which the temperature is higher than the vaporization temperature of the blowing aid at a normal (atmospheric) pressure but lower than the decomposition temperature of the polymer, at a pressure at which the blowing does not take place,

[2] in the said static mixing apparatus, the polymer composition to which the said blowing aid has been added is mixed with the blowing aid at the temperature, with a pressure higher than the vapor pressure of the said blowing aid being maintained, and the resultant polymer composition is passed through the static mixing apparatus, and

[3] the polymer composition to which the said blowing aid has been added is introduced into the devolatilizing tank through the extruding apparatus, having at least one opening section provided vertically downward, and the resultant polymer composition is extruded from the opening section of the extruding apparatus, so that the polymer is made into a blown product at such a temperature and a pressure that the blowing coefficient B given by the following expression (1) becomes 1.4 or more, and then the polymer from which volatile materials have been removed, with the blowing aid being released, is recovered:

$B = A'/A$  Expression (1)

wherein A represents the cross-sectional area of an opening section of the extruding apparatus, and A' represents the average cross-sectional area of the polymer composition in a direction perpendicular to the vertical direction of the blown polymer composition, at a point where the polymer composition is dropped from the lower part of the said opening section vertically 50 cm to 1 m;

(2) The method for removing volatile materials from a polymer composition as stated in the above (1), wherein the polymer composition containing the blowing aid is extruded in the form of a strand from the opening section of the extruding apparatus by the extruding apparatus;

(3) The method for removing volatile materials from a polymer composition as stated in the above (1) or (2), wherein the blowing aid is added in such a manner that the said blowing aid is out of contact with the pipe walls of the pipeline provided for the addition nozzle apparatus and the pipeline connecting the addition nozzle apparatus and the static mixing apparatus, until the blowing aid reaches the static mixing apparatus, and wherein the polymer composition and the blowing aid are passed through the static mixing apparatus with the pressure being maintained higher than the vapor pressure of the blowing aid;

(4) The method for removing volatile materials from a polymer composition as stated in any one of the above (1) to (3), wherein the said devolatilizing tank is operated under a pressure of 10 mmHg or more;

(5) The method for removing volatile materials from a polymer composition as stated in any one of the above (1) to (4), wherein the blowing aid is added in an amount of 10% by weight or less, based on the polymer composition; and (6) The method for removing volatile materials from a polymer composition as stated in any one of the above (1) to (5), wherein the blowing aid is at least one selected from the group consisting of water, aliphatic hydrocarbon compounds containing at least one hydroxyl group or carbonyl group, and having a boiling point lower than those of the unreacted monomer and solvent, and a mixture thereof.

In the present invention, the volatile materials to be removed mean volatile components in a polymer liquid composition containing a polymer, and examples include unreacted monomers used in the production of the polymer, organic solvents used for the production of the polymer, such as aliphatic hydrocarbons (e.g. hexane, heptane, octane, and decane), benzene, toluene, ethylbenzene, xylene, cumene, and other alkylbenzenes, halogenated hydrocarbons, halogenated aromatic hydrocarbons, nitrile compounds, amine compounds, and the like, which organic solvents can be used as polymerization solvents industrially, and oligomers (e.g. dimers and trimers of monomers).

Further, the polymer composition for use in the present invention refers to a polymer containing at least small amounts or trace amounts of volatile materials in a polymer. Herein, the polymer used in the present invention refers to a thermoplastic polymer, and, specifically, a polyethylene, an ethylene/α-olefin copolymer, a polystyrene, HIPS, ABS, a styrene/acrylic acid copolymer, a styrene/methacrylate copolymer, a polypropylene, a polyphenylene ether, a polycarbonate, a polyvinyl chloride, a polyetherimide, a polyamide, a polyester, a silicone polymer, such as a polysiloxane; a polybutadiene, a polyisoprene, an ethylene/propylene rubber, an ethylene/propylene/diene rubber, a butadiene/styrene rubber, and the like can be mentioned.

The present invention is characterized in that a polymer composition whose content of volatile materials is low can be purified further, and the content of volatile materials of the polymer composition to be processed is not particularly limited, but it is generally 2% by weight or less, preferably 0.01 to 2% by weight, and more preferably 0.05 to 1.5% by weight.

Figure 1:
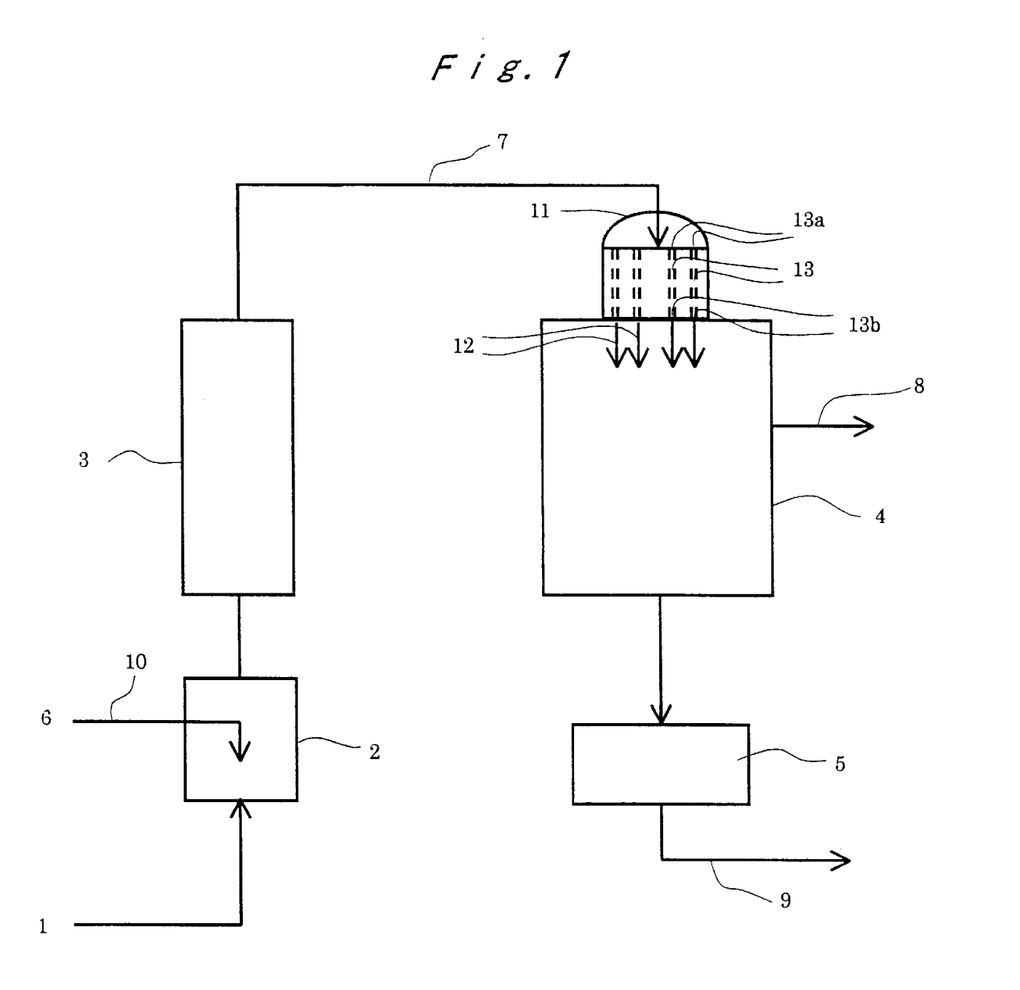
FIG. 1 is an illustrative diagram showing one embodiment of apparatus of the present invention.

The present invention is further described with reference to the drawing. FIG. 1 is an illustrative diagram showing one mode of the present invention. Herein, taking polystyrene as an example, arbitrarily, the description is made based on FIG. 1. The polystyrene is only an example, and the present invention is not limited to it.

A polystyrene composition 1, containing a polystyrene and volatile materials, including styrene monomer a and solvent, that is transferred from a polymerization reaction tank (not shown), is supplied to an addition nozzle apparatus 2, for a blowing aid (a devolatilization aid). The addition nozzle apparatus comprises at least one opening section directed in the direction opposite to the direction of the flow of the molten polystyrene to allow the blowing aid to be discharged and added continuously in the direction opposite to that of the flow of the molten polystylene. When the volatile materials amount to over 2% by weight, the polystyrene composition is previously supplied to a devolatilizing tank (not shown), before being supplied to the below-mentioned static mixing apparatus, and the polystyrene composition is processed with the conditions of the temperature and the pressure of the devolatilizing tank controlled, so that the polystyrene polymer composition may contain volatile materials in an amount of 2% by weight or less. On the other hand, a blowing aid 6, selected from the group consisting of water, aliphatic hydrocarbon compounds containing at least one hydroxyl group or carbonyl group, and having a boiling point lower than those of an unreacted monomer and solvent, and a mixture thereof, in an amount of less than 10% by weight based on the polystyrene composition, is supplied to the addition nozzle apparatus 2, through a line 10, and it is added by discharging it in a direction opposite to the direction of the flow of the molten polystyrene. In the present invention, when the blowing aid is added in the opposite direction, the blowing aid flows out of the addition nozzle in an overflowing fashion, to spread uniformly throughout the addition nozzle, and therefore the mixing performance in the subsequent static mixer 3 can be increased remarkably. Herein, the term "the introduction of the blowing aid in a direction opposite to the direction of the flow of the polymer composition" includes, besides the case in which the blowing aid is introduced in a direction directly opposite to the direction of the flow, the case in which the blowing aid is introduced in a direction opposite to the direction of the flow with a prescribed angle made with the direction of the flow. The angle is not limited, but it is preferably in the range of ±45°, and more preferably ±5°, with the direction utterly opposite to the direction of the flow of the polymer composition being 0°.

In contrast, when the blowing aid is added in the direction of the flow of the polystyrene composition opposite to the method of the present invention, the blowing aid is destined to be supplied to one point of the static mixer positioned downstream. Therefore, the blowing aid will not be dispersed or mixed uniformly, thereby lowering the mixing performance, unpreferably.

It is required to add the blowing aid with a pressure applied to the molten polymer composition (polystyrene) and the blowing aid, which are supplied to the addition nozzle apparatus 2, so that blowing may not take place, at a temperature range in which the temperature is higher than the vaporization temperature of the blowing aid at a normal pressure but lower than the decomposition temperature of the polymer. More preferably, the blowing aid added in this way is introduced into the static mixing apparatus 3, connected just after the addition nozzle apparatus 2, in such a manner that the blowing aid is out of contact with the pipe walls of the pipeline provided for the addition nozzle apparatus and the pipeline connecting the addition nozzle apparatus and the said static mixing apparatus, until the blowing aid reaches the static mixing apparatus provided for connecting.

Further, if the blowing aid comes in contact with the pipeline provided for the addition nozzle apparatus and the pipeline connecting the addition nozzle apparatus and the static mixing apparatus, before the blowing aid reaches the said static mixer 3, since the flow velocity of the polystyrene composition at the pipe wall section is very low, a thick layer of the blowing aid is formed, to lower the mixing performance of the static mixer. When there is no contact with the walls of the pipeline, a thick layer is not formed, and the performance of the static mixer is not lowered. Keeping the blowing aid thus out of contact with the walls of the pipelines can be realized by arranging the addition nozzle near the central part of the flow of the polystyrene composition, so that the addition nozzle may be out of contact with the pipeline.

Assuming that the other operating conditions are the same, the larger the added amount of the blowing aid 6 is, the more content of residual volatile materials in the final product after the devolatilizing tank. However, if the blowing aid is added in an amount exceeding a certain limit for the polymer composition, the increase in the effect is not remarkably observed. Therefore, the upper limit of the amount of the blowing aid to be added is about 10% by weight, while the lower limit is generally 0.1% by weight or more, to the amount of the polymer composition. The amount of the blowing aid to be added is preferably 0.5 to 3% by weight, based on the amount of the polymer composition. If the blowing aid is added in an amount exceeding 10% by weight, the increase in the effect is not remarkably observed, and the heat load for evaporating the blowing aid 6, and the heat load for recovering the evaporated blowing aid 6, are increased, which is economically unpreferable. To remove volatile materials effectively, preferably the blowing aid is added in an amount equal to or more than the amount of the volatile materials contained in the polymer composition. If the amount of the blowing aid is too small in comparison with the amount of the volatile materials contained in the polymer composition, the effect is less. On the other hand, if the blowing aid is added in an amount of not less than 10% by weight based on the polymer composition, not only is the effect not increased proportionally, but also the energy for recovering the flashed blowing aid is increased, as stated above, and an improvement, of example, for making the size of the devolatilizing tank and a vacuum pump large, is needed, which is unpreferable.

In the present invention, to remove volatile materials surely, the polymer composition and the blowing aid are heated, for melting, to a temperature higher than the vaporization temperature of the blowing aid, under a normal pressure. However, if that temperature is elevated to a temperature higher than the decomposition temperature of the polymer, the quality of the polymer is adversely influenced, which is unpreferable. Generally, the polymer composition and the blowing aid are heated preferably to a temperature lower than the decomposition temperature of the polymer by about 5 to 150° C., because the balance between the fluidity of the polymer and the devolatilization effect is good. Generally, the heating temperature is 100° C. to 400° C., and preferably about 150° C. to about 350° C. In the case of a polymer that is liable to be thermally modified, such as an impact-resistant polystyrene, a styrene/acrylonitrile copolymer, and an ABS copolymer, preferably, it is treated at a temperature of 260° C. or less. For example, in the case of a polystyrene, preferably it is treated at a temperature of 150° C. to 300° C., and more preferably 180° C. to 280° C.

In the present invention, preferably the blowing aid is not permitted to blow substantially until the polymer composition is introduced into the devolatilizing tank. Therefore, it is important to keep the pressure equal to or higher than the vapor pressure of the blowing aid at the above temperature. If the pressure is lower than the vapor pressure of the blowing aid, then the blowing takes place, the difference in density and viscosity between the gasified blowing aid and said polymer composition increases, and dispersion and mixing in the static mixing apparatus hardly occurs. As a result, the amount of residual volatile materials in the final product increases, in comparison with the operation under conditions at which the blowing aid is not permitted to blow in the static mixing apparatus. Accordingly, in the static mixing apparatus 3, the mixing is carried out at a pressure and a temperature at which the blowing aid does not blow until they are introduced into the devolatilizing tank, and, for example, when a polystyrene composition is used and water is used as the blowing aid, they are mixed in the static mixing apparatus with the pressure being kept at 40 bars or more, at 245° C. Since the static mixing apparatus has a simple structure and is low in pressure loss, less power is required, and it is very economical, which is preferable. Further, the static mixing apparatus is not particularly limited, as long as it is an in-line multistage continuous-type tubular mixing apparatus that can carry out mixing by dividing a flow, and generally a so-called static mixer can be used. Various static mixers whose structures of elements used therein vary from manufacturer to manufacturer are commercially marketed by multiple manufacturers.

After the blowing aid and the polystyrene composition introduced in the static mixing apparatus 3 are dispersed and mixed uniformly, they are introduced into a devolatilizing tank 4 through a line 7. In FIG. 1, this devolatilizing tank 4 is depicted as a front view, with the top and the bottom thereof in line with the vertical line, and the tank has an extruding apparatus 11, for the polymer composition thereon. The polymer composition is introduced through the line 7 into an upper part 13a of at least one opening section 13 provided in the extruding apparatus 11, and the composition is extruded from its lower part 13b, vertically (downward), as thin items, such as a blown polymer composition 12 in the state of strands. The extruding apparatus may be provided inside the devolatilizing tank.

The extruding apparatus has an opening section, as well as a control valve and a heater, preferably. While the pressure in the heater and the discharge flow rate are controlled by the control valve, the polymer composition is extruded into the devolatilizing tank through the opening section 13. The control valve is required to keep the pressure in the line 7 and the static mixing apparatus 3 before the line 7 under a pressure at which the blowing aid does not blow.

However, if the pressure in the line 7 and the static mixing apparatus 3 before the line 7 can be maintained only by the opening section at a pressure under which the blowing aid does not blow, the extruding apparatus is not particularly required to have the above control valve, and the control valve can be omitted. The position where the control valve is provided is preferably just before the point where the line 7 enters the devolatilizing tank. The heater contained in the extruding apparatus comprises a heat exchanger and is not particularly limited, as long as it is a heat exchanger generally used for heating a polymer solution, a multiple tube-type heat exchanger, a plate fin-type heat exchanger, and a static mixer-type heat exchanger. This heater may be situated either on or in the upper flange section of the devolatilizing tank. The extruding apparatus is not particularly required to be provided with the heater, and the said heater can be omitted if the temperature of the polymer composition sent from the line 7 has a temperature at which the fluidity is satisfactory retained, even when the polymer composition is cooled by the latent heat of vaporization upon the blowing of the blowing aid.

For the opening section, various valves and various dies used for extrusion molding apparatuses can be used. For example, as the valve, a needle valve, a purge valve, a vent plug, a diehead valve, and the like can be mentioned. As the die, in addition to a strand die for granulation, a manifold die, a fishtail die, a coat hanger die, a T-die for sheets, such as a screw die; a straight-type die, a crosshead-type die, a circular die for tubes, such as an offset die, and the like can be mentioned. These may be used singly, or two or more of them can be used in combination. The opening section may be situated either on or in the upper flange section of the devolatilizing tank, as long as the molten polymer composition can be introduced directly into the devolatilizing tank. Herein, the shape of the cross section of the opening section 13 of the introducing apparatus is not particularly limited, and any shape, such as a circular shape, an oblong shape, an angular shape, a linear shape, or a combination of these, or an indefinite shape, can be used. It is presumed that, depending on the operating conditions of the devolatilizing tank, blowing may be allowed a little in the extruding apparatus before the opening section, and generally, upon the introduction into the devolatilizing tank, water, for example, dispersed and mixed at a temperature and pressure at which the styrene-series polymer in the molten state can be retained in the liquid state, is released from the opening section into the devolatilizing tank all at once, thereby causing uniform blowing and removal of the volatile materials. It has been found that, at that time, when the styrene-series polymer in the molten state is supplied from the opening section vertically downward, the way in which the molten resin extruded from the lower part 13b of the opening section 13 is blown, makes the rate of the decrease of volatile materials greatly different. As the molten resin extruded from the opening section flows down vertically, quickly, at a constant flow velocity, and the blowing aid blows, the surface area thereof is increased, and the evaporation and the separation of volatiles are accelerated. That is, the effect of reducing volatile materials of the molten resin in a blown state that is extruded from the opening section, is made great when the blowing coefficient B, represented by the above expression (1), of the polymer blown product in a direction perpendicular to the vertical direction, is 1.4 or more. Further, when the blowing coefficient is increased to a certain extent, then, even if the blowing coefficient is made larger than that, the effect of reducing volatile materials is not changed; and, since nonuniform blowing takes place, thereby spattering the molten resin, to allow the resin to adhere to the inner wall of the devolatilizing tank, and making the retention of a stable cross-sectional shape impossible, and therefore the devolatilizing effect is decreased. Accordingly, the blowing coefficient is preferably 50 or less.

In the above expression (1), A' is obtained by observing the blown state through a looking glass or the like positioned on the devolatilizing tank wall near the opening section lower part 13b, and finding the average cross-sectional area from the shape of the blown polymer composition between 50 cm and 1 m in a direction perpendicular to the vertical direction. Since the polymer composition in a blown state that is observed is supplied continuously, there are one in a state of hanging from the opening section, and one in a torn-off state while blowing and dropping, but preferably the blowing is uniform and the blowing coefficient is 1.4 or more, with the shape in the perpendicular direction not being limited. Specifically, the blowing coefficient is determined by calculating the average value of the cross-sectional areas found from the shapes of the blown polymer, by taking photographs or video film of the molten resin in a blown state extruded from the opening section. Further, to secure such a blown state, as an operating condition of the apparatus, it is required that the melt viscosity of the polymer composition extruded from the extruding apparatus be at a viscosity at which the blown shape can be retained. The adjustment of such a viscosity can be made by controlling the temperature of the molten resin, i.e. by controlling the temperature of the resin to a temperature at which the balance between the fluidity and the devolatilizing effect is good, and then extruding the polymer composition from the opening section. During such a removal of volatile materials, the polymer is kept at least in the molten state.

Assuming that the average flow rate S of the molten resin passing through the opening section of the extruding apparatus is expressed by the per unit cross-sectional area of the opening section, a particularly preferable operating condition is that the operation is preferably carried out in the range shown by the expression (2):

$$2 \text{ g/mm}^2 \cdot \text{hr} < S < 20 \text{ kg/mm}^2 \cdot \text{hr} \qquad \text{Expression (2)}$$

In this range, the difference between the pressure of the molten resin before the introduction opening section, and the pressure of the molten resin after the introduction into the devolatilizing tank, becomes large; the blowing aid, dispersed and mixed at a temperature and a pressure at which the styrene-series polymer in the molten state can be kept in the liquid state, can be readily released in the devolatilizing tank all at once from the opening section; and as a result, uniform blowing takes place, thereby removing the volatile materials.

If the average flow rate is less than 2 g/mm2·hr, the blowing is not carried out continuously, and as a result, the devolatilizing effect becomes small. The average flow rate is preferably 20 g/mm$^2$·hr or more, and more preferably 100 g/mm$^2$·hr or more.

Further, if the average flow rate is over 20 kg/mm$^2$·hr, the throughput becomes too large, and uniform blowing becomes difficult, which is unpreferable. More preferably the average flow rate is 10 kg/mm$^2$·hr or less.

To keep the average flow rate in the preferable range, the opening diameter is such that, if a strand die or various valves are used for the opening section, the opening diameter of the pores or the orifices is selected to be in the range of generally 0.1 to 50 mm, and preferably 1 to 30 mm. In other dies, the width of the slits is generally 0.1 to 30 mm, and preferably 0.5 to 20 mm. When a strand die or various valves are used for the opening section, when the polymer composition is introduced from the extruding apparatus 11, having an opening section in the shape of a nozzle, into the devolatilizing tank 4, under conditions in which there is little blowing before the opening section, the polymer composition—containing the blowing aid that is kept under a pressure at which blowing does not take place, at a temperature range at which the temperature is higher than the vaporization temperature of the blowing aid at a normal pressure but lower than the decomposition temperature of the polymer—is permitted to blow all at once, and therefore it is extruded into uniformly blown strands. Simultaneously with the blowing of the blowing aid, the evaporation of volatile materials takes place, and therefore the polymer composition is blown in a manner that increase the diameter of the strands. In order to increase the devolatilizing effect, preferably the structure of the devolatilizing tank is designed such that there is a satisfactory distance between the opening section of the extruding apparatus and the bottom of the devolatilizing tank, so as to allow the shape of the strands to be retained until 15% or more of the blowing aid is allowed to blow and evaporate. Herein, the blowing rate of the blowing aid can be found by taking out the blowing polymer composition from a sampling hole attached to the bottom of the devolatilizing tank, and determining the amount of the blowing aid. Assuming that the average flow rate S of the molten resin passing through the introduction nozzle is expressed by the per unit cross-sectional area of the opening section in the shape of a nozzle, a particularly preferable condition for making the strands uniform is that the operation is carried out in the range shown by the above expression (2).

When the strands cannot be made uniform or they are blown off and torn off, in some cases, the effect of reducing volatile materials becomes small, since the blowing is non-uniform. When the strands are blown uniformly and the blowing coefficient is 1.4 or more, the blowing takes place uniformly, and it is presumed that the uniformly dispersed blowing aid in the devolatilizing tank is allowed to blow further uniformly, and the boundary film of the polymer itself is made thin, to permit volatile materials to evaporate easily. Although it is impossible to observe directly the state of cells formed by a blowing aid that blows in the molten resin, for example, the state of cells formed by water, it is believed that, since there is a large correlation between the blown state of the strands of the molten resin extruded from the opening section and the state of cells formed by water that blows in the molten resin, volatile materials can be reduced by controlling the diameter (thickness) of the strands. Herein, direct control of the blowing coefficient B of the strands of the molten resin extruded from the opening section may be effected by adjusting the temperature and the pressure in the devolatilizing tank, or the temperature and the pressure of the molten resin before extrusion from the nozzle, in the above-described ranges.

As is described above, the blowing aid 6 is introduced into the static mixer 3, where it is mixed, and then the polymer composition is passed through the line 7 and is introduced through the extruding apparatus 11, having at least one opening section 13, into the devolatilizing tank 4, where it is subjected to blowing.

In the devolatilizing tank 4, that is, the final stage, a vacuum is retained through a line 8 by a vacuum apparatus (not shown in this FIGURE), such as an ejector, a blower, and a vacuum pump. The devolatilizing tank is operated under a pressure of generally 8 mmHg or more and preferably 10 mmHg or more, but generally lower than 50 mmHg. In order to maintain the fluidity of the molten resin, heating is required, to raise the temperature of the devolatilizing tank to a temperature 5 to 150° C. lower than the decomposition temperature of the polymer, preferably to a temperature of 100 to 400° C., and more preferably a temperature of 150 to 350° C., since the blown molten resin is cooled by the latent heat of evaporation, to be brought to a highly viscous state with the molten resin blown. The pressure to be retained may be less than 8 mmHg, but a means is required to prevent water from freezing in a trap at the time when the water, as a blowing aid, flashed as described above, is recovered, and therefore the energy for the above is increased unpreferably.

The polystyrene treated under the above conditions is discharged from the devolatilizing tank 4 by a pump 5, and it is passed through a line 9, to be supplied to a granulator (not shown), to provide a product having a very low content of residual volatile materials.

Further, in the present invention, as the blowing aid that is added, water or an aliphatic hydrocarbon compound containing at least one hydroxyl group or carbonyl group, and having a boiling point lower than unreacted monomer or solvent, is used. Examples of such an aliphatic hydrocarbon compound include alcohols, such as methanol, ethanol, and isopropanol, and ketones, such as acetone and ethyl methyl ketone.

By carrying out the improved method for removing volatile materials of the present invention, the following excellent effects can be obtained:

(1) Volatile materials can be removed continuously from a polymer composition, and a polymer containing quite a small amount of volatile materials can be obtained, by adding a blowing aid to a polymer composition in a direction opposite to the direction of the flow of the polymer composition, and adjusting the blown state of the molten resin extruded from opening sections under a pressure higher than that in the conventional method, that is, under a pressure of 10 mmHg or more. Further, there is such an effect that, when water is used as a blowing aid, in recovering the water by condensation, a special means or apparatus for preventing the water from freezing is not required.

(2) If the operating conditions for reducing the amount of volatile materials contained in a polymer composition to quite a small amount are the same, a polymer composition that is quite less thermally deteriorated, less discolored and decomposed, and lower in the amount of volatile materials, in comparison with the conventional method, can be obtained by processing at a temperature lower than that in the conventional method.

The present invention is described in more detail based on the following Examples, but, of course, the following specific examples are not meant to restrict the present invention.

EXAMPLES

Example 1

In this Example, the same apparatus as shown in FIG. 1 was used, and as a polymer composition, a polystyrene (hereinafter referred to as GPPS), a polymer of styrene, and as a polymerization solvent, one containing ethylbenezene, were employed.

After the polystyrene, obtained by polymerization in a polymerization reaction tank, was devolatilized in a devolatilizing tank (not shown in the FIGURE) placed upstream of the FIGURE, under conditions of 230° C. and 350 mmHg, to bring the amount of volatile material to 2% by weight or less, the resultant polystyrene was supplied to the addition nozzle apparatus 2. In the addition nozzle apparatus 2, water was used as a blowing aid, and it was supplied to the addition nozzle apparatus 2 through the line 10, so that it would be added in a direction utterly opposite (an angle 0° to the direction of the flow) to the direction of the flow of the polystyrene. The position where the water was added was approximately the center of the flow of the polystyrene; the water was allowed to flow out of the addition nozzle in an overflowing fashion, to spread uniformly throughout the said addition nozzle, with a pressure being applied, so that blowing would not occur, at a temperature range at which the temperature was higher than the vaporization temperature of water at a normal pressure but lower than the decomposition temperature of the polymer; and the water was then introduced into the static mixing apparatus 3, connected immediately thereafter. The temperature and the pressure were kept so that blowing of water would not occur also in the static mixer 3.

The polystyrene composition in which water was dispersed uniformly, was introduced into the extruding apparatus 11, having multiple opening sections placed vertically downward, in which the opening sections had a width of 2 mm and a length of 200 mm (cross-sectional area: 399.14 mm$^2$), and the composition was extruded into the devolatilizing tank 4. In the devolatilizing tank 4, the temperature and the pressure were kept at 230° C. and 10 mmHg, respectively; the polystyrene composition was extruded into the devolatilizing tank, with the throughput being 0.2 kg/mm$^2$·hr per unit area of the opening sections, and simultaneously therewith, the water mixed therewith was released in the devolatilizing tank all at once from the opening sections, thereby producing the blown molten resin in the form of sheets.

The blown melted resin in the form of sheets was observed by video filming it through multiple looking glasses placed near the opening sections, and the value of the blowing coefficient B was determined from the above expression (1), by finding the average value of the cross-sectional areas of the blown polymer composition in a direction perpendicular to the vertical direction between 50 cm and 1 m below the opening sections.

The mass of residual volatile materials in the product was found by gas chromatography. The operating conditions and the results are shown together in Table 1.

Example 2

The processing was carried out in the same manner as in Example 1, except that the polystyrene composition in which water was dispersed uniformly, was supplied to the extruding apparatus 11, which had opening sections comprising multiple nozzles positioned vertically downward, in which the diameter of the nozzles was 2 mm (cross-sectional area: 3.14 mm$^2$), and that the temperature and the pressure in the devolatilizing tank 4 were kept at 245° C. and 10 mmHg, respectively. The polystyrene composition was extruded into the devolatilizing tank, with the throughput being 0.2 kg/mm$^2$·hr per unit area of the nozzles, and simultaneously therewith, the water mixed therewith was released in the devolitilizing tank all at once from the nozzles, thereby producing a blown molten resin.

The blown melted resin was observed by video filming through looking glasses placed near the nozzles, and the value of the blowing coefficient B was determined from the above expression (1), by finding the average value of the diameter of the blown polymer composition in a direction perpendicular to the vertical direction between 50 cm and 1 m below the nozzles.

The mass of residual volatile materials in the product was found by gas chromatography. The operating conditions and the results are shown together in Table 1.

Example 3

The processing was carried out in the same manner as in Example 2, except that, instead of the polystyrene, a high-impact polystyrene (HIPS) modified with butadiene rubber was used, and that the conditions were as shown in Table 1. The results are also shown in Table 1.

Example 4

The processing was carried out in the same manner as in Example 2, except that, instead of the polystyrene, a styrene/acrylonitrile copolymer (SAN) was used, and that the conditions were as shown in Table 1. The results are also shown in Table 1.

Example 5

The processing was carried out in the same manner as in Example 2, except that the amount of water added was reduced, and that the conditions were as shown in Table 1. The results are also shown in Table 1.

Example 6

The processing was carried out in the same manner as in Example 2, except that the operating conditions were changed as shown in Table 1. The results are also shown in Table 1.

Example 7

The processing was carried out in the same manner as in Example 2, except that the operating conditions of the devolatilizing tank were changed as shown in Table 1. The results are also shown in Table 1.

Example 8

The processing was carried out in the same manner as in Example 1, except that a polystyrene obtained by polymerization using, as a polymerization solvent, xylene instead of the ethylbenzene, was used, and that the conditions were as shown in Table 1. The results are also shown in Table 1.

Example 9

The processing was carried out in the same manner as in Example 2, except that, instead of water, methanol was used, and that the conditions were as shown in Table 1. The results are also shown in Table 1.

Example 10

The processing was carried out in the same manner as in Example 2, except that, instead of water, acetone was used, and that the conditions were as shown in Table 1. The results are also shown in Table 1.

Comparative Example 1

The processing was carried out in the same manner as in Example 1, except that the water was added in the same direction as the direction of the flow of the polystyrene, and that the conditions were as shown in Table 1. The results are also shown in Table 1.

Comparative Example 2

The processing was carried out in the same manner as in Example 2, except that the conditions of the pressure of the line 7 were as shown in Table 1. The results are also shown in Table 1.

Comparative Example 3

The processing was carried out in the same manner as in Example 2, except that the conditions were such that the amount of residual volatile materials in the polystyrene to be introduced into the addition nozzle apparatus 2, was over 2% by weight, as shown in Table 1. The results are also shown in Table 1.

TABLE 1

|  | Example 1 | Example 2 | Example 3 | Example 4 | Example 5 |
|---|---|---|---|---|---|
| Type of polymer in polymer composition | GPPS | GPPS | HIPS | SAN | GPPS |
| Type of solvent | Ethyl-benzene | Ethyl-benzene | Ethyl-benzene | Ethyl-benzene | Ethyl-benzene |
| Volatile materials (wt %) contained in polymer composition to be supplied to addition nozzle apparatus 2 | 0.94 | 0.94 | 0.82 | 0.27 | 0.94 |
| Temperature (C. °) of polymer composition to be supplied to addition nozzle apparatus 2 | 230 | 245 | 225 | 220 | 245 |
| Pressure (bars) in line 7 | 55 | 55 | 55 | 55 | 55 |
| Type of blowing aid | Water | Water | Water | Water | Water |
| Amount (wt %) of blowing aid added to addition nozzle apparatus 2, to amount of polymer composition | 2.9 | 2.9 | 2.9 | 2.9 | 1 |
| Direction of addition of blowing aid in relation to direction of flow of polymer composition | Opposite direction | Opposite direction | Opposite direction | Opposite direction | Opposite direction |
| Blowing coefficient | 5.2 | 7.3 | 4.7 | 3.9 | 3.5 |
| Operating pressure (mmHg) of devolatilizing tank | 10 | 10 | 10 | 12 | 10 |
| Operating temperature (° C.) of devolatilizing tank | 230 | 245 | 225 | 220 | 245 |

TABLE 1-continued

| | | | | | |
|---|---|---|---|---|---|
| Volatile materials (ppm) in final product | 68 | 61 | 37 | 79 | 74 |

| | Example 6 | Example 7 | Example 8 | Example 9 | Example 10 |
|---|---|---|---|---|---|
| Type of polymer in polymer composition | GPPS | GPPS | GPPS | GPPS | GPPS |
| Type of solvent | Ethyl-benzene | Ethyl-benzene | Xylene | Ethyl-benzene | Ethyl-benzene |
| Volatile materials (wt %) contained in polymer composition to be supplied to addition nozzle apparatus 2 | 0.82 | 0.48 | 0.35 | 0.94 | 0.94 |
| Temperature (C. °) of polymer composition to be supplied to addition nozzle apparatus 2 | 195 | 225 | 245 | 225 | 245 |
| Pressure (bars) in line 7 | 55 | 55 | 55 | 100 | 100 |
| Type of blowing aid | Water | Water | Water | Methanol | Acetone |
| Amount (wt %) of blowing aid added to addition nozzle apparatus 2, to amount of polymer composition | 2.9 | 2.9 | 2.9 | 2.9 | 2.9 |
| Direction of addition of blowing aid in relation to direction of flow of polymer composition | Opposite direction | Opposite direction | Opposite direction | Opposite direction | Opposite direction |
| Blowing coefficient | 3.3 | 4.2 | 6.8 | 5.7 | 6.4 |
| Operating pressure (mmHg) of devolatilizing tank | 10 | 30 | 10 | 10 | 10 |
| Operating temperature (° C.) of devolatilizing tank | 195 | 225 | 245 | 225 | 245 |
| Volatile materials (ppm) in final product | 71 | 54 | 82 | 58 | 65 |

| | Comparative Example 1 | Comparative Example 2 | Comparative Example 3 |
|---|---|---|---|
| Type of polymer in polymer composition | GPPS | GPPS | GPPS |
| Type of solvent | Ethyl-benzene | Ethyl-benzene | Ethyl-benzene |
| Volatile materials (wt %) contained in polymer composition to be supplied to addition nozzle apparatus 2 | 0.94 | 0.94 | 2.5 |
| Temperature (C. °) of polymer composition to be supplied to addition nozzle apparatus 2 | 245 | 245 | 245 |
| Pressure (bars) in line 7 | 55 | 5 | 55 |
| Type of blowing aid | Water | Water | Water |
| Amount (wt %) of blowing aid added to addition nozzle apparatus 2, to amount of polymer composition | 2.9 | 2.9 | 2.9 |
| Direction of addition of blowing aid in relation to direction of flow of polymer composition | The same direction | Opposite direction | Opposite direction |
| Blowing coefficient | 1) | | |
| Operating pressure (mmHg) of devolatilizing tank | 10 | 10 | 10 |
| Operating temperature (° C.) of devolatilizing tank | 245 | 245 | 245 |
| Volatile materials (ppm) in final product | 580 | 714 | 243 |

Note:
Blowing was nonuniform and resin was splashed.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A method for removing volatile materials from a polymer composition containing 2% by weight or less of the volatile materials, comprising the steps of:

forming a molten flow of said polymer composition;

combining the molten polymer composition with a blowing aid by discharging the blowing aid from an addition nozzle apparatus into the molten polymer composition in a direction opposing the direction of flow of the molten polymer composition;

introducing the polymer composition and the blowing aid into a static mixing apparatus to mix the polymer composition and blowing aid therein, the mixing being conducted at a temperature higher than the vaporization temperature of the blowing aid at a normal pressure but lower than the decomposition temperature of the polymer and at a pressure higher than the vapor pressure of the blowing aid so that blowing does not take place and a resultant mixture is formed;

introducing the resultant mixture into an extruding apparatus and extruding it therein to form an extruded mixture;

discharging the extruded mixture out of a downwardly facing opening member of the extruding apparatus into a devolatilizing tank where the mixture is blown at such a temperature and pressure that a blowing coefficient B given by the following expression (1) is at least 1.4 to form a blown product of the polymer composition from which the volatile materials have been removed and the blowing aid released, $$B=A'/A \qquad (1)$$

wherein A is the cross-sectional area of the opening member of the extruding apparatus and A' is the average cross-sectional area of the polymer composition in a direction perpendicular to the vertical direction of the blown polymer composition at a point where the polymer composition is dropped from said opening member vertically 50 cm to 1 m.

2. The method for removing volatile materials from a polymer composition as claimed in claim 1, wherein the extruded mixture is extruded in the form of a strand from the opening member of the extruding apparatus.

3. The method for removing volatile materials from a polymer composition as claimed in claim 1, wherein the blowing aid is added in such a manner that it does not contact with pipe walls of a pipeline provided for the addition nozzle apparatus and a pipeline connecting the addition nozzle apparatus and the static mixing apparatus, until the blowing aid reaches the static mixing apparatus, and wherein the polymer composition and the blowing aid pass through the static mixing apparatus with the pressure being kept higher than the vapor pressure of the blowing aid.

4. The method for removing volatile materials from a polymer composition as claimed in claim 1, wherein the devolatilizing tank is at a pressure of 10 mmHg or more.

5. The method for removing volatile materials from a polymer composition as claimed in claim 1, wherein the blowing aid is added in an amount of 10% by weight or less, based on the polymer composition.

6. The method for removing volatile materials from a polymer composition as claimed in claim 1, wherein the blowing aid is at least one selected from the group consisting of water, aliphatic hydrocarbon compounds containing at least one hydroxyl group or carbonyl group, and has a boiling point lower than an unreacted monomer and a solvent, and a mixture thereof.

7. The method for removing volatile materials from a polymer composition as claimed in claim 1, wherein the blowing aid is discharged from the addition nozzle apparatus in a direction directly opposite to the direction of the flow of the polymer composition.

8. The method for removing volatile materials from a polymer composition as claimed in claim 1, wherein the polymer is a thermoplastic polymer.

9. The method for removing volatile materials from a polymer composition as claimed in claim 1, wherein the average flow rate S of the extruded mixture passing through the opening member of the extruding apparatus, per unit cross-sectional area of the opening, is in the range shown by the expression (2):

$$2 \text{ g/mm}^2 \cdot \text{hr} < S < 20 \text{ kg/mm}^2 \cdot \text{hr} \qquad (2).$$

10. The method for removing volatile materials from a polymer composition as claimed in claim 1, wherein the blowing aid is discharged into the molten polymer composition at an angle of ±45° opposed to the direction of flow of the molten polymer composition, with an angle of 0° being directly opposite to the direction of flow of the molten polymer composition.

11. The method for removing volatile materials from a polymer composition as claimed in claim 1, wherein the addition nozzle apparatus is provided near the central part of the molten polymer flow.

12. The method for removing volatile materials from a polymer composition as claimed in claim 1, wherein from 0.01 to 2% by weight of volatile materials are contained in the polymer composition.

13. The method for removing volatile materials from a polymer composition as claimed in claim 5, wherein 0.1–10% by weight of blowing aid is used.

14. The method for removing volatile materials from a polymer composition as claimed in claim 13, wherein 0.5–3% by weight of blowing aid is used.

15. The method for removing volatile materials from a polymer composition as claimed in claim 10, wherein the blowing aid is discharged at an angle of ±5°.

* * * * *